United States Patent
Hawkes (10) Patent No.: US 7,245,902 B2
(45) Date of Patent: Jul. 17, 2007

(54) SECURE MESSAGING VIA A MOBILE COMMUNICATIONS NETWORK

(75) Inventor: Michael Hawkes, Staffordshire (GB)

(73) Assignee: 2 Ergo Limited, Lancashire (GB)

( * ) Notice: Subject to any disclaimer, the term of this patent is extended or adjusted under 35 U.S.C. 154(b) by 12 days.

(21) Appl. No.: 10/521,812

(22) PCT Filed: Jan. 13, 2003

(86) PCT No.: PCT/GB03/00083

§ 371 (c)(1),
(2), (4) Date: Jan. 21, 2005

(87) PCT Pub. No.: WO03/063528

PCT Pub. Date: Jul. 31, 2003

(65) Prior Publication Data

US 2006/0019634 A1    Jan. 26, 2006

(30) Foreign Application Priority Data

Jan. 16, 2002  (GB) ................................ 0200942.1
Oct. 4, 2002   (GB) ................................ 0223063.9

(51) Int. Cl.
*H04M 1/66* (2006.01)

(52) U.S. Cl. .................... 455/411; 455/422.1; 455/410; 455/415; 455/435.1

(58) Field of Classification Search ............. 455/411, 455/422.1, 410, 415, 435.1; 713/16, 170, 713/200; 709/206, 218, 219
See application file for complete search history.

(56) References Cited

U.S. PATENT DOCUMENTS

| | | | |
|---|---|---|---|
| 5,146,217 A | 9/1992 | Holmes et al. | |
| 5,479,408 A | 12/1995 | Will | |
| 5,678,179 A | 10/1997 | Turcotte et al. | |
| 5,875,403 A | 2/1999 | Christal | |
| 5,930,239 A * | 7/1999 | Turcotte | 370/310 |
| 6,167,252 A * | 12/2000 | Cohen | 455/410 |
| 6,311,054 B1 * | 10/2001 | Korpela | 455/406 |
| 6,842,628 B1 * | 1/2005 | Arnold et al. | 455/556.2 |
| 6,928,290 B2 * | 8/2005 | Byers et al. | 455/455 |
| 2002/0006782 A1 | 1/2002 | Kim | |
| 2002/0131592 A1 * | 9/2002 | Hinnant | 380/46 |
| 2002/0187750 A1 * | 12/2002 | Majumdar | 455/41 |
| 2003/0083078 A1 * | 5/2003 | Allison et al. | 455/466 |

(Continued)

FOREIGN PATENT DOCUMENTS

DE    20009413    11/2000

(Continued)

OTHER PUBLICATIONS

Salzman et al, "Periodic Radio User Check in with Personal Identification Code", Motorola Technical Developments, Motorola Inc. Schaumburg, Illinois, US, vol. 17, Dec. 1, 1992, pp. 43-44.

*Primary Examiner*—Lester G. Kincaid
*Assistant Examiner*—Gary Au
(74) *Attorney, Agent, or Firm*—Nixon & Vanderhye P.C.

(57) ABSTRACT

A mobile terminal is adapted to receive a message via a mobile communications network; request authentication data from the user of the mobile terminal; and automatically generate an acknowledgement message to the sender of the message including the authentication data.

65 Claims, 8 Drawing Sheets

U.S. PATENT DOCUMENTS

2003/0100292 A1* 5/2003 Kynast et al. .............. 455/412

FOREIGN PATENT DOCUMENTS

| | | |
|---|---|---|
| EP | 1011285 | 6/2000 |
| EP | 1063813 | 12/2000 |
| EP | WO 02/060121 | 12/2000 |
| EP | 1065899 | 1/2001 |
| EP | 1 107 623 | 6/2001 |
| EP | 1 119 132 | 7/2001 |
| EP | 1122928 | 8/2001 |
| EP | 1 164 457 | 12/2001 |
| EP | 1365604 | 11/2003 |
| EP | 1 271 436 | 12/2003 |
| EP | 1 315 391 | 1/2004 |
| FI | 200000425 | 8/2001 |
| FR | 2809 922 | 12/2001 |
| FR | 2 817 108 | 5/2002 |
| GB | 2261579 | 5/1993 |
| GB | 2 285 200 | 6/1995 |
| GB | 2327567 | 1/1999 |
| GB | 2356530 | 5/2001 |
| GB | 2369753 | 6/2002 |
| GB | 2380897 | 4/2003 |
| GB | 2381419 | 4/2003 |
| GB | 2404126 | 7/2003 |
| GB | 2384402 | 1/2005 |
| JP | 2000031958 | 1/2000 |
| JP | 2001111545 | 4/2001 |
| JP | 2001339765 | 12/2001 |
| KR | 2001055631 | 7/2001 |
| SE | 200000853 | 9/2001 |
| WO | WO 92/17006 | 10/1992 |
| WO | WO 95/12933 | 5/1995 |
| WO | WO 95/12948 | 5/1995 |
| WO | WO 96/37064 | 11/1996 |
| WO | WO 97/20443 | 6/1997 |
| WO | WO 97/45814 | 12/1997 |
| WO | WO 98/37663 | 8/1998 |
| WO | WO 99/16277 | 4/1999 |
| WO | WO 99/35768 | 7/1999 |
| WO | WO 99/35783 | 7/1999 |
| WO | WO 99/37104 | 7/1999 |
| WO | WO 99/39524 | 8/1999 |
| WO | WO 00/42787 | 7/2000 |
| WO | WO 00/54457 | 9/2000 |
| WO | WO 01/64201 | 10/2000 |
| WO | WO 01/06697 | 1/2001 |
| WO | WO 01/09735 | 2/2001 |
| WO | WO 01/65798 | 9/2001 |
| WO | WO 01/78428 | 10/2001 |
| WO | WO 01/80525 | 10/2001 |
| WO | WO 01/82639 | 11/2001 |
| WO | WO 01/86978 | 11/2001 |
| WO | WO 01/95091 | 12/2001 |
| WO | WO 01/95558 | 12/2001 |
| WO | WO 02/17653 | 2/2002 |
| WO | WO 03/019884 | 3/2003 |

* cited by examiner

SECURE MESSAGING VIA A MOBILE COMMUNICATIONS NETWORK

This application is the US national phase of international application PCT/GB03/00083 filed Jan. 13, 2003 which designated the U.S. and claims benefit of GB 0200942.1, dated Jan. 16, 2002 and GB 0223063.9, dated Oct. 4, 2002, the entire content of which is hereby incorporated by reference.

BACKGROUND

1. Technical Field

The present invention relates to a method of transmitting messages via a mobile communications network. More particularly, but not exclusively, the invention relates to methods of transmitting SMS text messages of the GSM system in a secure way.

2. Related Art

For mobile communication device users, SMS text messages provide a quick, convenient method of sending and receiving messages. Messages are transmitted via a messaging centre. If messages cannot be delivered to the mobile terminal, they are stored at the messaging centre until they can be delivered. However, it may happen that messages eventually 'time-out' without warning.

SMS also provides a rarely used option to send 'flash messages', which appear immediately on the device, without requiring user interaction to read them. The SMS standard also supports e-mail (via X-400 protocols) and both binary and text based data.

The conventional short messaging like the SMS service in GSM systems has the drawback that the service is unsuitable for many applications, such as electronic commerce or other applications where a secure and controlled data delivery is required. Below, we set out some reasons why the conventional short messaging is unsuitable for secure data delivery.

Firstly, the sender of a message is usually not informed whether the message has been delivered to the receiving mobile terminal and has been received by the user. The GSM system provides also for acknowledged messaging, wherein an acknowledgment is transmitted to the sender of the message as soon as the message is delivered to the messaging centre. However, the sender cannot know whether the message reached the mobile terminal and, more particularly, whether the message actually reached the user for whom the message was intended.

Secondly, data transmitted via SMS may be decoded by third parties with a suitable digital receiver. Moreover, the messages are usually stored in the mobile terminal's memory. Thus any third party gaining access to the terminal may read the messages.

Thirdly, the user of a mobile terminal cannot necessarily be identified in many cases. Especially by transmitting a SMS message via the Internet or other delivery mechanisms, the identity of the sender of the message may be concealed to the receiving user, or the recipient of the message may not be that intended by the sender.

BRIEF SUMMARY

It is an aspect of the present invention to alleviate some or all the disadvantages described above.

According to another aspect of the present invention there is provided a mobile terminal adapted to receive a message via a mobile communications network; to request authentication data from the user of said mobile terminal; and automatically generate an acknowledgment message to the sender of said message including said authentication data.

In this way the user of the receiving terminal is only required to enter the authentication data such as a PIN number and the receiving terminal subsequently generates the acknowledgement message and transmits it to the sender of the original message. The sender of the message may then verify the authentication data in order to verify that the recipient of the message is the intended user and is informed that the user actually received the message.

According to another aspect of the present invention, there is provided an authentication system for transmitting information, said authentication system storing identification information of a plurality of providing users and a plurality of receiving users and being adapted to receive information from at least one of said providing users; authenticate said at least one providing user; authenticate a receiving user as the recipient of said information; and transmit a message based on said information via a mobile communications network to said one receiving user's mobile terminal.

In this way the communications between users are controlled by a central authentication system (AS). Each user has to register with the AS prior to using their services. The AS then verifies the user's identity. In this way a receiving user ensures that the information transmitted in a message actually originated from an identified providing user. The possibilities of fraud are accordingly reduced.

According to one aspect of the present invention there is provided a method of transmitting a message via a mobile telecommunications network from a sender's terminal to a user's mobile terminal, wherein the user is required to acknowledge receipt of said message in a predetermined way and an acknowledgement message is subsequently transmitted to the sender of said message.

In this way the receiving user needs to take action when the message has reached the receiving terminal. The message may only be displayed after the receiving user has taken action and the sender of the message is subsequently informed whether delivery was successful and thus whether the message actually reached the user.

According to another aspect of the present invention there is provided a method of transmitting a text message via a mobile communications network, wherein a portion of said text message is encrypted using a private/public key pair and wherein said public key is valid only for a predetermined number of text messages. Preferably, said public key is transmitted in either said text message or a text message sent prior to said text message.

In this way a high security standard can be achieved and at the same time only a limited number of messages is required to achieve this standard. Preferably, the public key is only used for one communication, i.e. for a message and a response thereto. Preferably, a private key complementing the public key is used for encryption of the message at the sender's device and another private key for decrypting the message is held at the receiving user's terminal.

BRIEF DESCRIPTION OF THE DRAWINGS

Further aspects and advantages of the invention will be appreciated, by way of example only, from the following description and accompanying drawings, wherein:

FIGS. 7 A and B are flowchart diagrams illustrating the process of transmitting a message according to a yet further embodiment of the present invention.

DETAILED DESCRIPTION OF EXEMPLARY EMBODIMENTS

Figure 1:
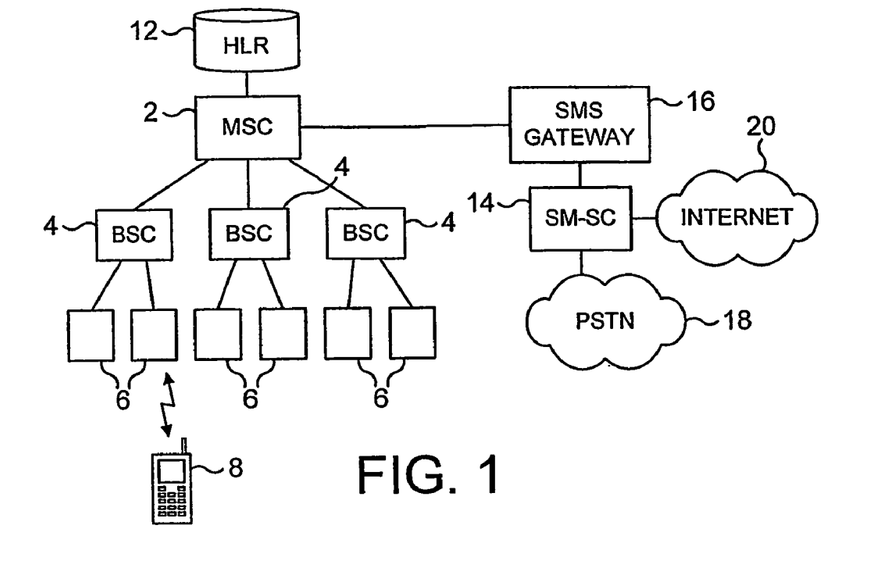
FIG. 1 is a schematic outline of a mobile telecommunications network according to the GSM standard in which the present invention can be implemented.

In FIG. 1 a schematic outline of a mobile telecommunications network according to the GSM standard is shown. A Mobile Switching Centre (MSC) is connected via communication links to a number of Base Station Controllers (BSCs) 4. The BSCs are dispersed geographically across areas served by the Mobile Switching Centre 2. Each BSC 4 controls one or more Base Transceiver Stations (BTSs) 6 located remote from, and connected by further communication links to, the BSC 4. Each BTS 6 transmits radio signals to, and receives signals from, mobile stations 8 which are in an area served by that BTS 6. The area is referred to as a "cell". A GSM network is provided with a large number of such cells, which are ideally continuous to provide continuous coverage over the whole network territory.

The mobile switching centre is provided with a Home Location Register (HLR) 12 which is a database storing subscriber data. SMS messages are sent via a Short Message Service Centre (SM-SC) 14. The MSC 2 is connected to the SM-SC 14 via a SMS gateway 16. Such gateways exist for mobile terminating short messages and also for mobile originating short messages.

If a short message is to be transmitted from a mobile terminal 8 to its final destination, the terminal 8 sets up a signalling connection to the MSC 2 and the message is subsequently transmitted via the SMS gateway 16 to the SM-SC 14. From there the message is then delivered to its final destination, which may for example be another mobile terminal or a mailbox. The GSM system provides for a delivery acknowledgement, which indicates that the SM-SC has received the message from a mobile terminal. However, the GSM system does not support an automatic acknowledgement to indicate whether the message has reached its ultimate destination.

A short message which is addressed to a mobile terminal 8 is first routed to the SM-SC 16. The message may be transmitted to the SM-SC 16 by another mobile terminal, or by other suitable means such as the public switched telephone network PSTN 18 and a human operator or via the Internet 20. The short message is subsequently transmitted to the SMS gateway 16 and forwarded to the relevant MSC 2, which delivers it to the mobile station 8. The delivery to the mobile station does not involve the user.

However, if the mobile station cannot be reached, then the message is kept in the SM-SC 14 and is delivered to the mobile terminal as soon as possible. Usually an automatic "alert" process is started, which notifies the SM-SC 14 when the terminal connects to the mobile communications network.

All the systems described above are commercially available products, which do not need to be described in more detail.

In the following we will summarise aspects of different embodiments of the present invention. It is appreciated that these aspects may be implemented individually or in any combination.

The extended messaging method uses a conventional messaging framework via a mobile communications network like for example the SMS framework in the GSM systems. However, the method provides additional features, which are all implemented in software. The applications are running on the participating servers or terminals as software applications. Thus no modification of the user terminal's hardware or of the underlying messaging protocol, such as the SMS messaging protocol, is required to implement the extended messaging method.

In the extended messaging method the receiving user has to acknowledge receipt of a transmitted message. When the message has reached the receiving terminal (RT) the receiving user (RU) needs to take action and the sender of the message is subsequently informed whether the RU has taken action and thus whether the message actually reached the user. In one embodiment of the extended messaging method the RU needs to take action in order to be able to display the message after it has reached the RT. If the sender does not receive a response, the message is automatically re-sent. The user may define the number of times the message is re-sent.

In the extended messaging method the users communicate via a central authentication system (AS). Such an AS may be implemented using a conventional server or computer and a system capable of communicating via the mobile communications network. Each user has to register with the AS prior to using the extended message service.

The extended messaging method automatically generates a formatted message or response from the data and information the user enters. Only a minimum of input is required and the provided interface requires little or no training for the user. The system then brings the response data into the required format so that a user can make use of all desired options allowing enhanced security in a simple and user-friendly manner.

The text to be submitted using the extended messaging method is automatically encrypted. Again, a minimal user input is required and only a minimal number of messages is required while a high security standard is achieved. The text may be encrypted using a public key specific for the transmission of one message (or one message response pair). According to the extended messaging method, the public key, which is used for encryption/decryption, is subsequently transmitted in un-encrypted form together with the encrypted text message in one and the same message. A private key complementing this public key and also being specific for the transmission of this message may be used at the sender's terminal for encrypting the message. This public/private key pair or key being specific for a communication is referred to as a message key pair or message key in the following. The RU holds an additional private key at his terminal for decrypting the transmitted message and encrypting any possible response to that message. The private key stored at the RU terminal is not specific to the ongoing communication.

Alternatively, the AS generates a public/private message key pair prior to a communication or transmission requested by a user and sends the public message key to the user terminal. The AS stores the private message key for future use. Upon reception, the user terminal stores the public message key pair.

If the user wants to send a secure message, the public message key is used for encrypting the message text together with the private user-specific key stored in the user terminal. The message key is thus directly available, and does not need to be transmitted prior to sending a secure message (but after transmission of a message of the extended format has been requested by the user. The public message key may for example be transmitted in a first message (or response message) from the AS to the user terminal for use in a second message.

To enhance the security the user can request that a response is sent to the sender of the message before the message is actually displayed to the RU. If this response message cannot be delivered to the sender, the terminal will re-try to send the response message. If the response message cannot be delivered after a predetermined number of re-tries, the original message is not displayed to the RU, but deleted from the RT.

The user may also choose to store or delete any response to the transmitted message. If the response is not stored any memory temporarily holding the response message is deleted immediately after the response message has been transmitted from the RT.

Figure 3A:
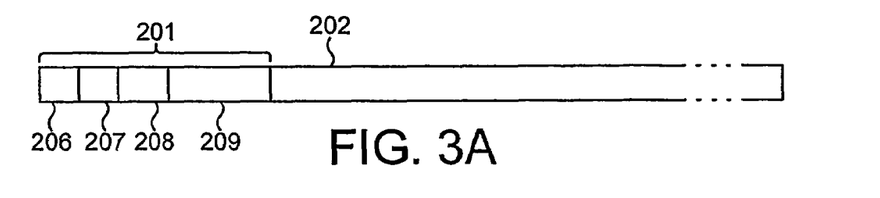
FIG. 3A is a schematic diagram illustrating the format of a conventional SMS message according to the prior art and FIG. 3B is a schematic diagram illustrating the format of an extended SMS message according to another embodiment of the present invention.
Figure 3B:
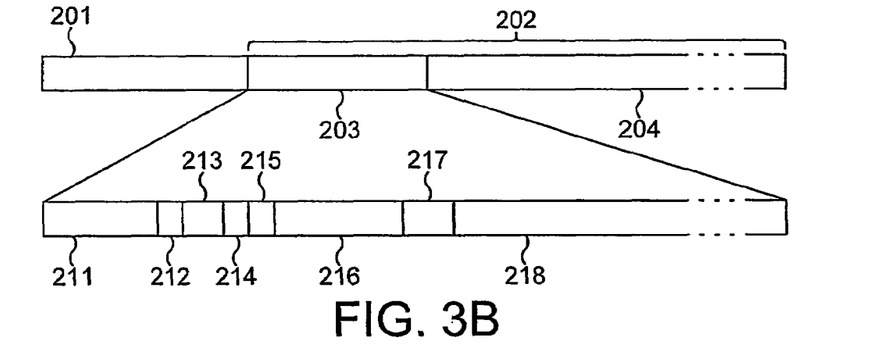

Referring now to FIG. 3, the format of a conventional SMS message and an extended SMS message according to one embodiment of the present invention is illustrated.

The SMS message format according to the prior art (FIG. 3A) contains a header 201 and a text body 202. The header includes a field 206 identifying the SMS message type, a parameter 207 identifying the SMS service provider and parameters 208 and 209 identifying the originating and distribution address, respectively. The format typically allows for the transmission of a 140 or 160 byte text body 202.

Referring now to FIG. 3B, the format of the extended message is described. The extended message also contains the header 201 and text body 202, and is thus fully compatible with the conventional type. However, the text body 202 includes an additional header 203 specific to the extended message format, which is incorporated into the conventional text body 202. The remaining capacity of text body 202 is available as text body 204 of the extended format. The text body 204 of the extended format is thus reduced in length compared to text body 202 of the conventional type. The extended format can be identified using the field 206 identifying the SMS message type of the conventional header 201. In case that the extended format cannot be identified in this manner, an additional header will be required to identify the message type to the terminals.

FIG. 3B further illustrated the individual fields 211 to 218 of the additional header 203 according to one embodiment. The first field of 8 bit contains the messaging service type. The value in this field defines the method used to encode the text body 204. Field 212 of 1 bit indicates whether the RU is required to take action prior to displaying the message text. Field 213 determines the maximal number of re-tries which may be used to deliver the message to the RU. The 2 bit field allows up to 4 retries to be requested. In field 214 (1 bit) the user may request that a response is transmitted to the sender of the message before the message is displayed. If the response message cannot be delivered to the sender after a predetermined number of re-tries, the terminal does not display the original message to the sender. Field 215 (1 bit) determines whether any possible response message is stored in the RT in a "sent messages" folder.

If the response is not required to be stored, then the terminal will clear any memory holding the response immediately after the response message has been transmitted. Field 216 stores information about the software version such that the software versions of the software installed at the sender's and the receiving user's terminal can be compared. 1 byte is reserved for this field. Field 217 of 3 bits is reserved for future use. In field 218 the public key specific for this on-going transmission is transmitted in the message header 203 from the sender to the RU. This public key or a corresponding private message key was used for encryption of the text body of the transmitted message. The RT will extract the key and use it for decrypting the text body and may also use it for encryption of a response. 128 bits are reserved for field 218. However, fewer bits may be used for transmitting the public key.

The extended messaging method ensures that not only the terminals participating in a transaction or the transmission of information, but also the user of the terminals are known or identified. A central AS verifies the identity of each user of the extended messaging method service prior to offering access to it. Every user who wants to use the extended messaging method service needs to register with the AS. The AS is responsible for ensuring that the user is known to the AS and the AS verifies the identities of the users according to a pre-defined and published standard. The AS requires identification data from a registering user and stores the user data in a secure way. The identification data usually contain name, address, IMSI and a personal password or a personal identification number (PIN) chosen by the user or other suitable security data. The identification data may also contain security relevant data about any prior transactions of the user via the AS.

At registration, the AS then generates a public/private key pair personal for each user. It stores the public key together with the user data in the secure data store and communicates the private key to the user. The private key may for example be communicated using the process of updating software as will be described below with reference to FIG. 5.

Referring now to FIG. 4, we will describe the process of transmitting an extended message from an originating user (OU) via an AS to a RU.

In step 302 the OU contacts the AS and requests an extended message, for example by sending a conventional SMS message from the originating terminal (OT). The request is transmitted to the AS in step 304. The AS then checks whether the OU is a registered user and verifies the user's identity (step 306).

In step 308 the AS extracts the identification data stored for the OU such as the PIN and a private key specific for the OU. The AS generates a public key specific for the transmission of data for the requested extended message in step 309 and transmits the public key via a conventional SMS to the OU (step 310). The OT then automatically generates a message according to the pre-defined extended message format (step 311). The settings of fields 211 to 217 can be pre-defined by the user or may be entered by the user specifically for the extended message to be transmitted. The OT requests the text to be transmitted and the IMSI number of the RU like in a conventional SMS message. In addition, the OT requests a PIN for authorising the user of the OT (step 312).

The OU enters the requested data in step 314 and the OT encrypts the message text body and the PIN using the public key received in step 310 and a private key received on registration. The generated message does not include a public key, thus field 218 is empty. In step 318 the OT transmits the extended message to the AS. The AS extracts the PIN and the text body from the received extended message and decrypts the data (step 320) using its private key extracted in step 308 and the public key which the AS generated in step 309 and transmitted to the OU in step 310. In step 322, the AS compares the PIN received and decrypted in steps 318 and 320 to the PIN extracted from the secure user database in step 308.

If the PINs do not match in step 322, the AS may send a new message to the OU requesting a PIN for authorisation. The user may enter the PIN a second time, the OT encrypts the PIN and steps 318 to 322 are repeated. The process can be repeated until the correct PIN is entered, but the possible numbers of re-tries are predetermined by the AS. If the maximal number of re-tries is reached, the process is aborted (step 324).

If the PINs in step 322 match, the process continues in step 326. The AS extracts the IMSI number of the RU from the message received in step 318 and checks whether the RU is a registered user and verifies the RU's identity in step 326. The AS extracts RU related data from the database in step 328. These data include a public key specific to the RU and further include a PIN provided by the RU at registration. The data may also include preferred settings defined by the RU.

In step 330 the AS generates a public/private key pair specific to the ongoing communication with the RU. In step 332 the AS then encrypts the text body of the message received from the OU in step 318 using the public user specific key extracted in step 328 and the private transaction-specific key generated in step 330. In step 334 the AS then generates a message in the extended message format as described above and transmits the message to the mobile terminal of the RU.

Data fields 211 to 217 of the extended SMS message are set according to predefined settings in the user data store or may be specified by the OU specifically for the message to be transmitted and according to the specific security requirements of the information to be transmitted. The terminal receives the SMS message and identifies from the header 201 that the received message is a message of the extended format.

The RT extracts and interprets the additional header 203 and extracts the transmitted public transaction key in step 336. If the field 212 of the additional header is set, then the RT requests a PIN number for identification of the user before the message is displayed to the user (step 340). After the RU enters his PIN number in step 342, the RT encrypts the PIN number in step 344 using the transmitted public key and its private key and transmits the PIN in a SMS message to the AS (step 346).

In step 348 the AS decrypts the transmitted PIN using the public transaction key and its private key extracted in step 328. In step 350 the AS verifies the entered PIN by comparing it with the user specific PIN stored in the secure user data store to check whether the data match. If the data do not match, the AS may send a message to the RT requesting the correct PIN. The AS determines the possible number of re-tries before the process is aborted. If the PIN is successfully verified, the AS sends a confirmation message to the RT in step 352. The RT then extracts its private key and decrypts the text body 204 using the transmitted public transaction key and its private key in step 353.

On receipt of this confirmation message the RT then displays the decrypted text message in step 354. The user can then read the text body of the message and might want to respond to the message. For responding, the user needs to enter the response data in step 356 and to press a "send" key of the terminal. The RT then automatically generates a message according to the extended messaging method. The RT encrypts the response using its private key and the public transaction key transmitted in step 334. The fields 211 to 217 are automatically set according to predefined values or the same values are used as in the SMS message of step 334.

The RT transmits the response message to the AS in step 358. After receiving the encrypted user response, the AS decrypts the response text body using its private key and the public RU's key in step 360. Subsequently the AS transmits the response to the OU in analogy to steps 328 to 354.

In the following additional steps of the process are described which will be performed if field 214 of the additional header 203 is set. The RT requests, encrypts and transmits the PIN as described above in steps 338 to 346. The AS decrypts and verifies the PIN and decrypts the received message as described with reference to steps 348 to 353. However, the AS then generates a response message to the OU in order to further confirm the origin of the message. This response message transmitted from the AS to the OU requires an acknowledgement from the OT.

If the AS cannot deliver the response message or does not receive an acknowledgement message acknowledging receipt of the response message at the OT, then the AS re-tries after a predetermined time interval to deliver the response message a predetermined number of times or until the AS receives an acknowledgement message from the OT. If the AS finally does not receive an acknowledgement message, then the AS sends a message to the RT notifying the RT of the negative outcome of the response message. In this case the RT does not display the message to the RU, but notifies the user accordingly.

If the AS receives an acknowledgement message from the OT, then the AS notifies the RT of the acknowledged response message together with the message of step 352 and subsequently decrypts and displays message to the RU as described above with reference to steps 303 and 354.

A further layer of security can be added if the PIN number itself forms part of the encryption algorithm. In this case the AS extracts the RU's PIN number in step 308 and encrypts the text data to be sent to the RU using the PIN, the public transaction key and the AS's private key.

The message can only be decrypted and displayed after the user enters the correct PIN number.

Figure 7A:
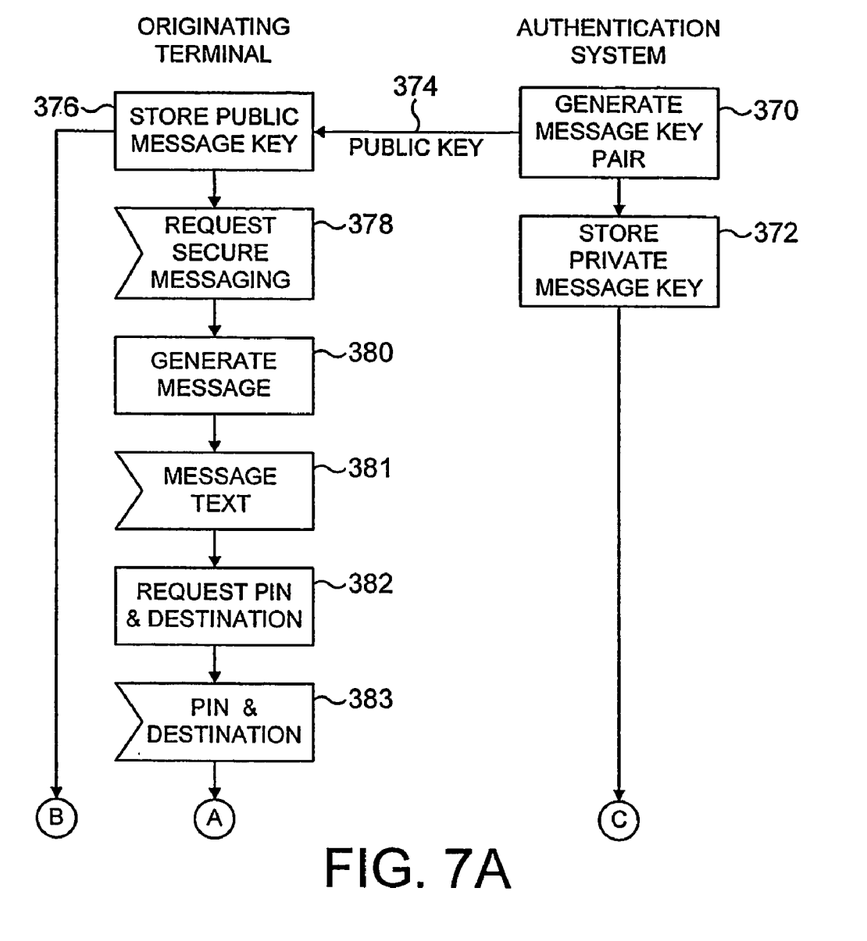
Figure 7B:
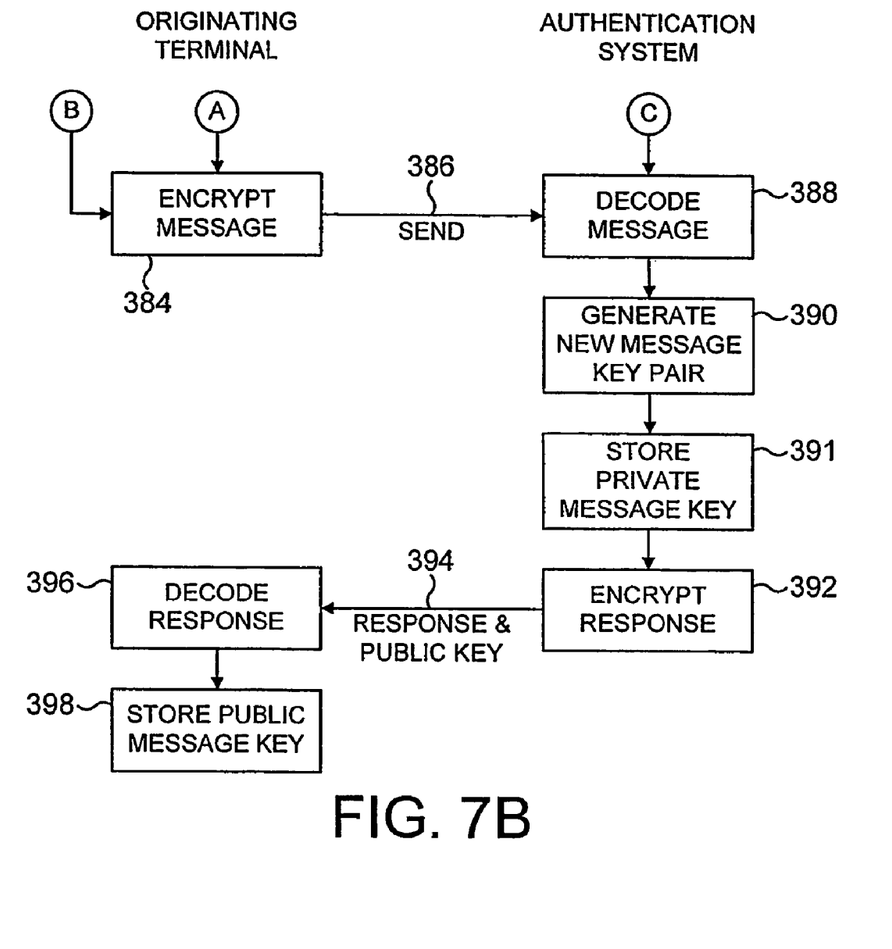

Referring now to FIG. 7, we will describe the process of transmitting an extended message from an originating user to an AS according to another embodiment of the present invention.

The process starts with an initialisation process (steps 370 to 376), which is performed only once before any extended messages are transmitted between the user and the AS. In step 370 the AS creates a public/private key pair, which is to be used for encryption of a message or a message response pair. The AS stores the private key in the AS database (step 372) and sends the public key to the OT (step 374). In step 376 the OT receives the public key and stores it for future use. The public key is stored in a secure way, for example within an electronic wallet of the handset.

If the OU wants to send a secure message, the user requests an extended message (step 378) by pressing a predefined key or a combination of keys. The OT then automatically generates a message according to the predefined extended message format and provides the OU with a screen for entering the OU's message (step 380). In step 381 the user enters the message text. The OT then requests the PIN and destination for the message (step 382), and the OU enters the requested data in step 383. In step 384 the OT encrypts the message using the stored private key and the public message key received from the AS in step 374 of the initialisation process. The OT sends the message of extended format to the AS in step 386. Upon receipt of the message, the AS decodes the message in step 388 and processes the message further, for example by sending the message text as a further message of the extended format to the RT (see steps 326 to 360 of FIG. 4B). For further communication with the OT, the AS subsequently discards the message key pair, and generates a new message key pair in step 390. If a response is to be transmitted from the AS to the OT, the AS encrypts the response (step 392) using the public key specific to the OT and the message private key generated in step 390. The AS sends the public message key together with the encrypted response to the OT (step 394). In step 396, the OT decodes the response message using the private key specific for the OT and stored therein. The public message key transmitted from the AS to the OT in step 394 is stored in the handset for future use as in the initialisation step 376. If the OU now wants to send a secure message of the extended message format, the user can directly request to send such a message as described above with reference to step 378. The initialisation steps 372 to 376 do not have to be performed, as the message key pair is already generated at the AS (in step 390) and transmitted to the OT (in step 394) during processing of the last extended message.

If the message sent in step 386 from the OT to the AS does not require a response, the AS transmits a message including the public message key, but without a message text in step 394. The OT then stores the public message key like described with reference to step 398 above.

Figure 4A:
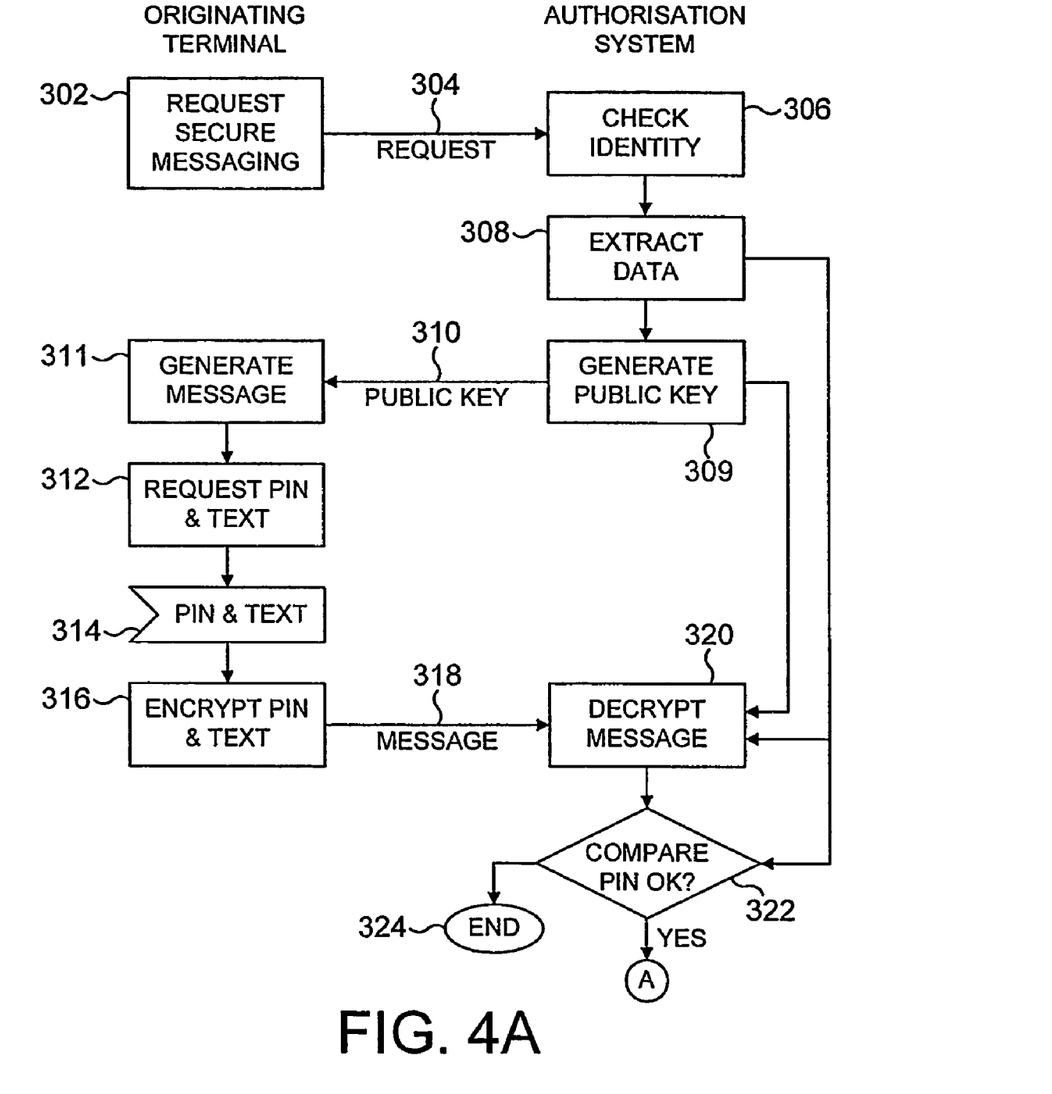
FIG. 4 is a flowchart diagram illustrating the process of transmitting a message according to a further embodiment of the present invention.
Figure 4B:
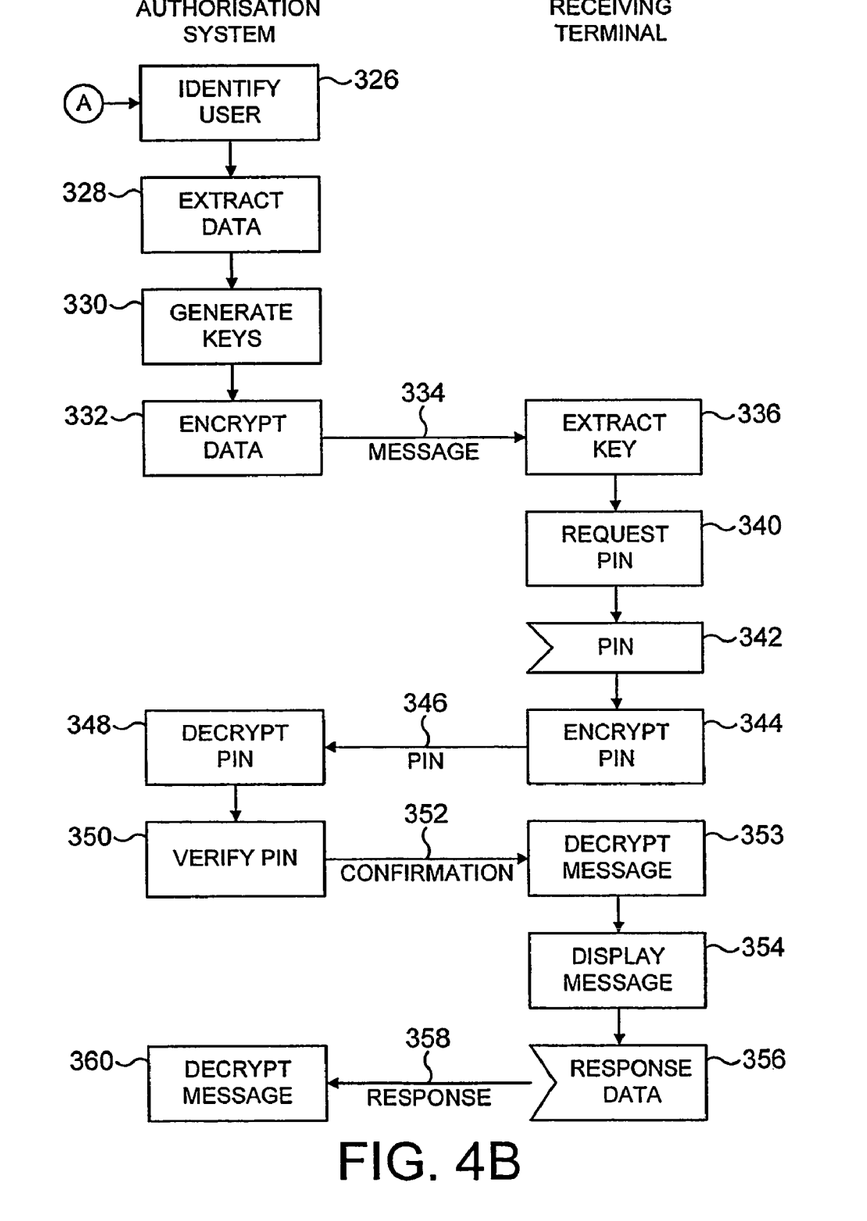

By using an extended message as described above with reference to FIG. 7, the user can directly send a secure message encrypted with a public/private key pair specific for a message or message response pair without contacting the AS pair to sending the message (as was described with reference to FIG. 4A).

Figure 5:
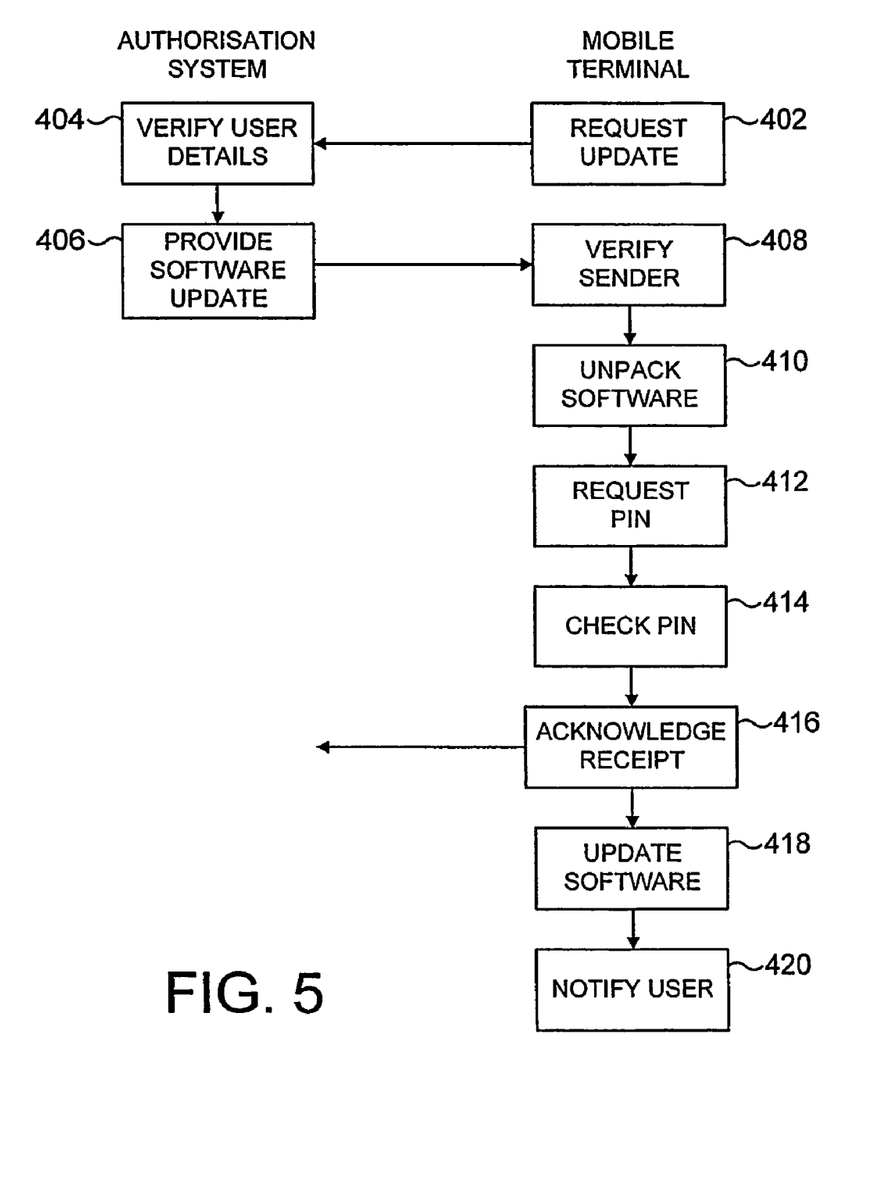
FIG. 5 is a flowchart diagram illustrating the process of updating software according to another embodiment of the present invention.

Referring now to FIG. 5, the process of updating the software applications for the extended messaging method is described.

As described above, field 216 of header 203 include information about the software version used for generating the message. When the RT interprets the data of header 203, the RT compares the software version stored on the RT to the version indicated in field 216. If the information does not match, the RT contacts the AS for a software update. The RT might process the transmitted message although a mismatch has been detected if the software versions are compatible. In case that they are not compatible, the RT will reject the message. The AS will then delay retransmission of the message until the RT has been provided with the updated software.

For updating the software, the user contacts the AS via a predefined route in step 402, for example using a conventional SMS message. In step 404, the AS verifies the user details. Subsequently, the AS sends the software update via a SMS message to the RT (step 406). The software version and also the service type are specified in the message. In step 408 the RT verifies that the software does indeed originate from the AS. This can for example be done by comparing the IMSI number the RT contacted in step 402 with the IMSI number from which the software update originated. If the source of the software update cannot be verified, the user is immediately alerted and the process is stopped. However, if the sender is successfully verified, the RT subsequently unpacks the software (step 410). In step 412 the RT displays a notification about the software update to the user and requests the user's conventional PIN for accessing the mobile terminal if such PIN identification is implemented. The RT checks whether a valid PIN has been entered (step 414). If the PIN has not been entered or is incorrect, the RT allows for a predetermined number of retries. After a successful verification of the PIN, the RT sends a message to the AS acknowledging receipt of the software update (step 416). The RT then stores the software in its memory and updates the application software automatically in step 418. The RT notifies the user in step 420 that the software update is completed.

The extended messaging method is advantageous also for other applications where a secure and reliable transmission of data is required.

In another embodiment the security of the extended messaging system is further enhanced by including a transaction reference counter. The transaction reference counter is installed both in the AS and in the user's terminal.

The AS has a transaction reference counter specific to each registered user terminal. Whenever a message is successfully received, the transaction reference counter is incremented in the AS and in the user's terminal. The transaction reference is included in each message transmitted from the user to the AS, either as part of the encrypted message body or in the message header.

The transaction reference counter of the user's terminal and of the AS (specific to the particular user) must always be synchronous in order for the message to be valid. The AS compares the transaction reference of its counter for the given user terminal with the transaction reference received from the user terminal. The AS will only respond correctly if the message from the OT contains a transaction reference matching the transaction reference counter for the given user terminal.

If the transaction references do not match, the AS disables the extended message service until the mismatch is solved.

The transaction reference on a user's terminal is set in an initialisation procedure when the software is downloaded from the AS to the terminal.

The transaction reference is only transmitted in extended messages from the user terminal to the AS, but not from the AS to the user terminal (except in the initialisation procedure at software download). Instead, both transaction reference counters (in the user's terminal and the AS) maintain their own internal counters. In this way additional security is provided.

Figure 2:
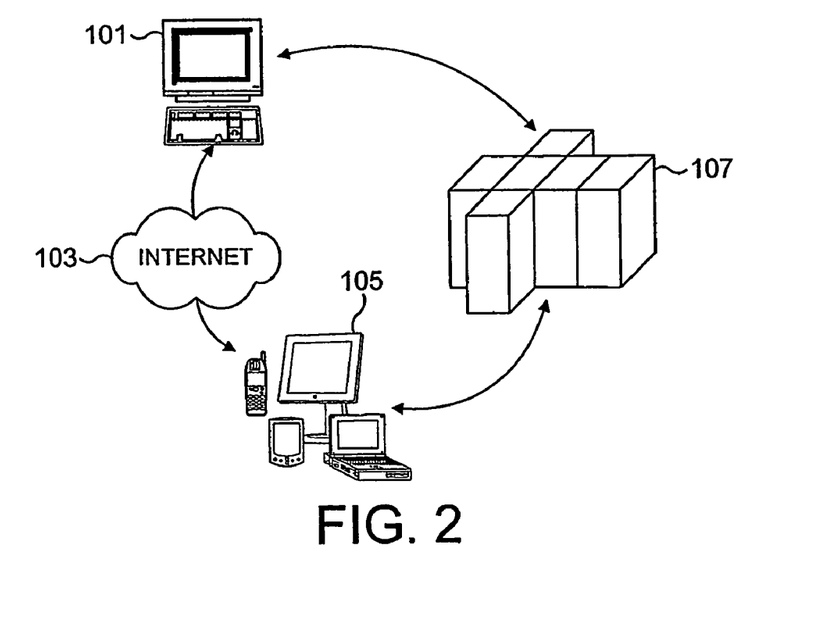
FIG. 2 is a schematic diagram illustrating the participating parties and communications between those parties according to one embodiment of the present invention.

In the following we describe an electronic commerce transaction using the extended messaging method with reference to FIG. 2. In such a scenario a merchant or service provider has a server 101 with a connection to the Internet 103 over which he offers goods or services. A user accesses the merchant's server via the Internet 103 with a computer or a mobile terminal or another suitable device and selects and requests goods or services. The communications for settling the payment and for sending confirmations are performed via the central AS 107. The merchant communicates with the AS via a secure channel and the AS communicates with the user using the extended messaging method via the mobile communications network using terminals 105.

Figure 6:
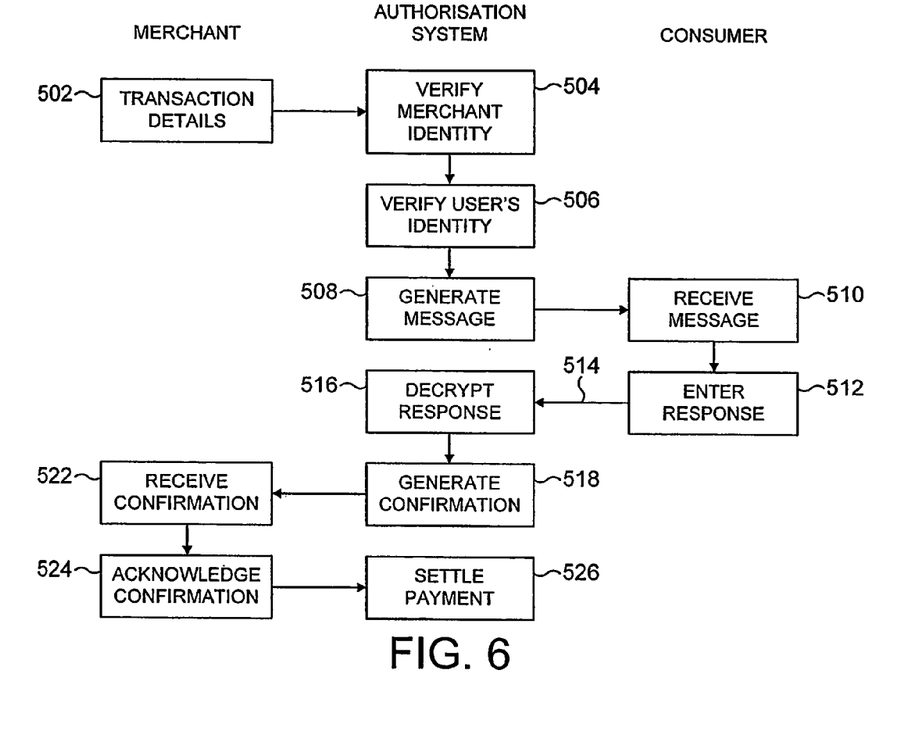
FIG. 6 is a flowchart diagram illustrating the process of an electronic commerce transaction using the extended messaging method according to yet another embodiment of the present invention.

The individual steps of the process are illustrated in FIG. 6. After the user has selected and required goods or services, the merchant contacts the AS via a predetermined secure channel and makes a request for authentication in step 502. The merchant also communicates the details of the purchase to the AS. The AS then verifies the merchant's identity in step 504. The AS extracts the consumer's name or IMSI from the data communicated by the merchant and verifies the consumer's identity in step 506. If the AS cannot identify either the merchant's or the consumer's identity, the process is aborted.

If both identities have been verified, the AS then generates a message (step 508) based on the information communicated in step 502. The message may for example contain details about the selected goods or services and/or details about the payment for the goods or services. The message is then generated, transmitted to the user and verified as described above with reference to FIG. 4B in steps 326 to 354. The user may then enter response data to the secure message in step 512, such as details about the payment and/or confirmation to payment method.

Again, an extended message is generated at the RT and transmitted to the AS (step 514). The AS decrypts the message in step 516. To further enhance the security, the AS may send a confirmation response to the merchant (step 518 and 522) via a predetermined secure communication channel. The merchant is then required to respond to this confirmation message (step 524). This ensures that a transaction can only be conducted if both legitimate parties have agreed to the transaction, i.e. after the merchant acknowledged the confirmation message. The AS then settles payment of the purchase in step 526.

The extended messaging method may also be used for voting systems via a mobile communications network. Previously registered users or a regional or national selection of registered users are provided with a PIN which are created randomly at the AS. These numbers are subsequently sent to the users as an extended message message requiring an acknowledged response as described above. After the AS received the acknowledgement message, it activates the PINs.

On the election day, a further extended messaging method is sent to the registered users. This message contains a choice of candidates and requests the PIN as transmitted earlier. The user can then respond using an extended message response as described earlier in a secure way. Exactly one such message is sent per user and the PIN prevents unauthorised voting.

Other possible applications for the extended messaging method include a secure method of accessing for example a computer system or building. The user requests an access code from the AS via the mobile communications network. The AS subsequently verifies the identity of the requesting user and transmits an access code in a secure message. An alternative PIN may be entered by the user to indicate that he is being coerced or is in distress, thus alerting relevant authorities without compromising the user's safety.

Whilst in the above described embodiments SMS messages according to the GSM standard are described, it is appreciated that alternatively other messaging methods via mobile communications networks can be used, such as MMS (Multimedia Message Service) and USSD (Unstructured Supplementary Service Data).

Whilst in the above described embodiments the extended messaging method is implemented in software applications running on the terminals of the mobile communications system, it is appreciated that alternatively the method can be implemented as a SIM Toolkit application. The SIM Toolkit or SIM Application Toolkit extends the role of the SIM card and allows the SIM card to be programmed to carry out new functions.

It is to be understood that the embodiments described above are preferred embodiments only. Namely, various features may be omitted, modified or substituted by equivalents without departing from the scope of the present invention, which is defined in the accompanying claims.

What is claimed is:

1. An authentication system for transmitting information, said authentication system storing identification information of a plurality of providing users and a plurality of receiving users and being adapted to
   receive information from at least one of said providing users;
   authenticate said at least one providing user;
   transmit a message including said information via a mobile communications network to a receiving user's mobile terminal;
   extract a public key specific to said receiving user from said stored identification information; and
   use said further public key for encryption of said at least part of said message.

2. An authentication system for transmitting information, said authentication system storing identification information of a plurality of providing users and a plurality of receiving users and being adapted to
   receive information from at least one of said providing users;
   authenticate said at least one providing user;
   transmit a message including said information via a mobile communications network to a receiving user's mobile terminal;
   receive an acknowledgement message or a response message from said receiving user; and
   transmit a confirmation message to said one providing user based upon said acknowledgement or response message;
   wherein said confirmation message requires an acknowledgement message from said one providing user and said authentication system further being adapted to send a confirmation message to said receiver user's terminal, notifying the terminal to decrypt and display the decrypted part of said message.

3. A method of transmitting a message via a mobile telecommunications network from a sender's device to a user's terminal,
   wherein the user is required to acknowledge receipt of said message in a predetermined way and an acknowledgement message is subsequently transmitted to the sender of said message;
   wherein at least a portion of the text message is encrypted by the sender's device before transmission and decrypted by the receiving terminal before display;
   wherein the text message comprises a first portion including the body of said message and a second portion containing encryption data used for encryption of said body and required for decryption of data included in said body; and
   wherein authentication data provided by the receiving user and/or response data to said message are encrypted using said encryption data.

4. A method of transmitting a message via a mobile telecommunications network from a sender's device to a user's terminal,
wherein the user is required to acknowledge receipt of said message in a predetermined way and an acknowledgement message is subsequently transmitted to the sender of said message;
wherein in said sender's device and in said receiving user's terminal a transaction reference counter is implemented and wherein each of said transaction reference counters is incremented if a message is successfully received; and
wherein a transaction reference is included in every message transmitter from the receiving user to the sender.

5. A method according to claim 4, wherein said sender compares the received transaction reference with its transaction reference counter and the sender only responds if the received transaction reference matches the sender's transaction reference counter.

6. An authentication system for transmitting information, said authentication system storing identification information of a plurality of providing users and a plurality of receiving users and being adapted to
receive information from at least one of said providing users;
authenticate said at least one providing user; and
transmit a message including said information via a mobile communications network to a receiving user's mobile terminal;
further being adapted to
extract a public key specific to said receiving user from said stored identification infonnation and to use said further public key for encryption of said at least part of said message;
provide a communication specific public/private key pair valid only for a single communication between the authentication system and said receiving user,
provide a communication specific public/private key pair valid only for a single communication between the authentication system and said receiving user, wherein said communication comprises a message and a response to said message;
encrypt at least part of said message using said communication specific public/private key pair; and to
send said communication specific public key to said receiving user as part of said message.

7. An authentication system according to claim 6 further being adapted to authenticate a receiving user as the recipient of said information.

8. An authentication system according to claim 6 wherein a response to said message comprises an acknowledgement message or a response message from said receiving user.

9. An authentication system according to claim 8 further being adapted to transmit a confirmation message to said one providing user based upon said acknowledgement or response message.

10. An authentication system according to claim 9 wherein said confirmation message requires an acknowledgement message from said one confirmation message to said receiver user's terminal, notifying the terminal to decrypt and display the decrypted part of said message.

11. An authentication system according to claim 7 wherein said user is required to authenticate himself by providing authentication data.

12. An authentication system according to claim 7 wherein said user's terminal automatically generates said acknowledgement message upon supply of said authentication data and/or response data.

13. An authentication system according to claim 7 wherein a central authentication system verifies the user's authentication.

14. An authentication system according to claim 7 wherein said message or a portion thereof is only displayed to the receiving user if the receiving user provides a valid authentication.

15. An authentication system according to claim 6 wherein said message is a SMS message according to the GSM standard.

16. An authentication system according to claim 6 wherein in said authentication system and in said receiving user's terminal a transaction reference counter is implemented and wherein each of said transaction reference counters is incremented if a message is successfully received.

17. An authentication system according to claim 16 wherein a transaction reference is included in every message transmitter from the receiving user to the authentication system.

18. An authentication system according to claim 17 wherein said sender compares the received transaction reference with its transaction reference counter and the authentication system only responds if the received transaction reference matches the authentication system's transaction reference counter.

19. An electronic commerce system incorporating an authentication system according to claim 6.

20. An electronic voting system incorporating an authentication system according to claim 6.

21. An authentication system for transmitting information, said authentication system storing identification information of a plurality of providing users and a plurality of receiving users and being adapted to
receive information from at least one of said providing users;
authenticate said at least one providing user; and
transmit a message including said information via a mobile communications network to a receiving user's mobile terminal;
further being adapted to
extract a public key specific to said receiving user from said stored identification information and to use said further public key for encryption of said at least part of said message;
provide a communication specific public/private key pair valid only for a single communication between the authentication system and said receiving user; wherein said communication comprises a message and/or a response to said message;
send said communication specific public key to said receiving user terminal prior to said communication and store said public key in said mobile terminal; and to
encrypt at least part of said message using said communication specific public/private key pair.

22. An authentication system according to claim 21 further being adapted to authenticate a receiving user as the recipient of said information.

23. An authentication system according to claim 21 wherein a response to said message comprises an acknowledgement message or a response message from said receiving user.

24. An authentication system according to claim 23 further being adapted to transmit a confirmation message to said one providing user based upon said acknowledgement or response message.

25. An authentication system according to claim 24 wherein said confirmation message requires an acknowledgement message from said one providing user and said authentication system further being adapted to send a confirmation message to said receiver user's terminal, notifying the terminal to decrypt and display the decrypted part of said message.

26. An authentication system according to claim 22 wherein said user is required to authenticate himself by providing authentication data.

27. An authentication system according to claim 22 wherein said user's terminal automatically generates said acknowledgement message upon supply of said authentication data and/or response data.

28. An authentication system according to claim 22 wherein a central authentication system verifies the user's authentication.

29. An authentication system according to claim 22 wherein said message or a portion thereof is only displayed to the receiving user if the receiving user provides a valid authentication.

30. An authentication system according to claim 21 wherein said message is a SMS message according to the GSM standard.

31. An authentication system according to claim 21 wherein in said authentication system and in said receiving user's terminal a transaction reference counter is implemented and wherein each of said transaction reference counters is incremented if a message is successfully received.

32. An authentication system according to claim 31 wherein a transaction reference is included in every message transmitter from the receiving user to the authentication system.

33. An authentication system according to claim 32 wherein said sender compares the received transaction reference with its transaction reference counter and the authentication system only responds if the received transaction reference matches the authentication system transaction reference counter.

34. An electronic commerce system incorporating an authentication system according to claim 21.

35. An electronic voting system incorporating an authentication system according to claim 21.

36. A method of transmitting a message via a mobile telecommunications network from a sender's device to a user's terminal, wherein
the user is required to acknowledge receipt of said message in a predetermined way;
an acknowledgement message is subsequently transmitted to the sender of said message;
said user is required to authenticate himself by providing authentication data; and a central authentication system verifies the user's authentication; and wherein
at least a portion of the text message is encrypted by the sender's device before transmission and decrypted by the receiving terminal before display, the text message comprising a first portion including the body of said message and a second portion containing encryption data used for encryption of said body and required for decryption of data included in said body; and
wherein said authentication data provided by the receiving user and/or response data to said message are encrypted using said encryption data.

37. A method according to claim 36 wherein said user's terminal automatically generates said acknowledgement message upon supply of said authentication data and/or response data.

38. A method according to claim 36 wherein said message or a portion thereof is only displayed to the receiving user if the receiving user provides a valid authentication.

39. A method according to claim 36 wherein said second portion is unencrypted.

40. A method according to claim 36 wherein said first portion of said text message is encrypted using a private/public key pair, wherein said public key is valid only for a predetermined number of text messages and wherein said public key is transmitted in said second portion of said text message.

41. A method according to claim 36, wherein said encryption data are valid only for a single communication between the sender and the receiving user, said communication comprising said message and a response to said message.

42. A method according to claim 36 wherein said encryption requires further encryption data stored in the sender's device.

43. A method according to claim 36 wherein said decryption requires further encryption data stored in the receiving terminal.

44. A method according to claim 42 wherein said further encryption data is a public key transmitted in a text message, which is transmitted prior to said text message.

45. A method according to claim 36 wherein at least a portion of said message and/or response message to said message is automatically deleted after a predetermined time period from said mobile terminal.

46. A method according to claim 36 wherein authentication data are used for encryption and decryption of said portion of said message.

47. A method according to claim 36 wherein conventional short message protocols and software applications running on the communications devices are used to implement the method.

48. A method according to claim 36 wherein said message is a SMS message according to the GSM standard.

49. A method according to claim 36 wherein in said sender's device and in said receiving user's terminal a transaction reference counter is implemented and wherein each of said transaction reference counters is incremented if a message is successfully received.

50. A method according to claim 49 wherein a transaction reference is included in every message transmitter from the receiving user to the sender.

51. A method according to claim 50 wherein said sender compares the received transaction reference with its transaction reference counter and the sender only responds if the received transaction reference matches the sender's transaction reference counter.

52. An electronic commerce system incorporating a method of transmitting a message via a mobile telecommunications network according to claim 36.

53. An electronic voting system incorporating a method of transmitting a message via a mobile telecommunications network according to claim 36.

54. An authentication system according to claim 8, further being adapted to decrypt at least part of said response message using said communication specific public/private key pair.

55. An authentication system according to claim 6, wherein said information received from said providing users is encrypted and said authentication system is operable to decrypt said information before forwarding said information on to said user terminal.

56. An authentication system according to claim 55, wherein said information is encrypted using a public/private key pair valid only for a single transaction between said providing user and said authentication system.

57. An authentication system according to claim 56, wherein said public key is transmitted to said providing user's terminal before said information is received by said authentication system.

58. An authentication system according to claim 57, wherein said public key is transmitted to said providing user in response to a request received by said authentication system.

59. An authentication system according to claim 57, wherein said public key is transmitted to said user in a prior communication.

60. An authentication system according to claim 23, further being adapted to decrypt at least part of said response message using said communication specific public/private key pair.

61. An authentication system according to claim 21, wherein said information received from said providing users is encrypted and said authentication system is operable to decrypt said information before forwarding said information on to said user terminal.

62. An authentication system according to claim 61, wherein said information is encrypted using a public/private key pair valid only for a single transaction between said providing user and said authentication system.

63. An authentication system according to claim 62, wherein said public key is transmitted to said providing user's terminal before said information is received by said authentication system.

64. An authentication system according to claim 63, wherein said public key is transmitted to said providing user in response to a request received by said authentication system.

65. An authentication system according to claim 63, wherein said public key is transmitted to said providing user in a priori communication.

* * * * *